(12) United States Patent
Guibene

(10) Patent No.: US 12,374,116 B2
(45) Date of Patent: *Jul. 29, 2025

(54) METHODS AND APPARATUS FOR USING WIDE AREA NETWORKS TO SUPPORT PARKING SYSTEMS

(71) Applicant: Charter Communications Operating, LLC, St. Louis, MO (US)

(72) Inventor: Wael Guibene, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 268 days.

This patent is subject to a terminal disclaimer.

(21) Appl. No.: 18/100,572

(22) Filed: Jan. 23, 2023

(65) Prior Publication Data
US 2023/0169774 A1 Jun. 1, 2023

Related U.S. Application Data

(63) Continuation of application No. 16/820,608, filed on Mar. 16, 2020, now Pat. No. 11,562,580.

(51) Int. Cl.
*G06V 20/52* (2022.01)
*G06T 11/00* (2006.01)
(Continued)

(52) U.S. Cl.
CPC .............. *G06V 20/52* (2022.01); *G06T 11/00* (2013.01); *G06V 10/56* (2022.01); *G06V 20/62* (2022.01);
(Continued)

(58) Field of Classification Search
CPC ........ G06V 20/52; G06V 10/56; G06V 20/62; G06V 30/18105; G06V 30/10; G06T 11/00; G06T 2210/22
See application file for complete search history.

(56) References Cited

U.S. PATENT DOCUMENTS 11,562,580 B2 * 1/2023 Guibene ................ G06V 10/56

* cited by examiner

*Primary Examiner* — Ayodeji O Ayotunde
(74) *Attorney, Agent, or Firm* — Straub & Straub; Michael P. Straub; Stephen T. Straub

(57) ABSTRACT

A customer premises parking system including one or more cameras and wireless communications transmission capability is described. The presence of a vehicle with a license plate at an entrance or exit of a parking area is detected and one or more high resolution images are captured and time stamped. A license plate portion of the HD image is captured and stored. The license plate number and corresponding time is determined and communicated using a wide area wireless network. The HD license plate portion of the image is processed to produce a low resolution version of the license plate image which is segmented and processed into fragments which are transmitted via the wide area network using available transmission opportunities. A high resolution version of the license plate portion is stored at the premises where the parking facilitate is located and can be retrieved via a cellular wireless interface in the event of a dispute or discrepancy with regard to the detected and reported license plate number. From the time stamps associated with entrance and exit images of license plates the amount of time and/or date at which a vehicle was present at the parking garage is determined and the vehicle owner billed for the use of the parking facility.

20 Claims, 8 Drawing Sheets

(51) Int. Cl.
   *G06V 10/56*   (2022.01)
   *G06V 20/62*   (2022.01)
   *G06V 30/18*   (2022.01)
   *H04N 1/60*   (2006.01)
   *G06V 30/10*   (2022.01)
(52) U.S. Cl.
   CPC ..... *G06V 30/18105* (2022.01); *H04N 1/6016* (2013.01); *G06T 2210/22* (2013.01); *G06V 30/10* (2022.01)

METHODS AND APPARATUS FOR USING WIDE AREA NETWORKS TO SUPPORT PARKING SYSTEMS

RELATED APPLICATIONS

The present application is a continuation of U.S. Patent Application Ser. No. 16/820,608, filed on Mar. 16, 2020, which published as US 2021-0287032 A1 on Sep. 16, 2021, and which is hereby expressly incorporated by reference in its entirety.

FIELD

The present invention relates to use of wireless communications systems, and more particularly, to methods and apparatus for using wide area networks and/or other wireless networks to support parking systems.

BACKGROUND

Parking systems often rely on a variety of methods to control access to one or more parking spaces and/or track usage by a vehicle of a parking space so that the operator or owner can be charged for the use of the parking space.

Many parking garage systems rely on the issuance of tickets by a distribution device at a gate an entry to a parking garage. The ticket usual includes printed or magnetically embed information that indicates the date and/or time of entry to the parking garage. Upon exit the ticket is presented and the amount to be charged determined based on the information on the ticket.

Such systems are often prone to problems of ticket loss or damage and in many cases require the presence of a human parking attendant to resolve such issues.

Other parking systems rely on a meter at each parking spot in a parking area. Such systems often require entry of coins or electronic payment in the form of a credit card. Single parking meter systems can be costly to implement since in a large parking lot a meter is often required for each spot. This results in a large initial deployment cost with potentially high ongoing operating costs due to the use of a large number of meters, e.g., one per spot of a parking lot or garage. Jamming of meters, e.g., to slugs or dirty coins being placed in the meters and/or physical damage to meters can be costly requiring routine maintenance and may result in the loss of the ability to use a parking spot during times a meter is not functioning properly. Furthermore such systems often rely on the use of parking police or parking lot attendants to make sure the parking spots are being paid for through use of the meters and/or ticketing or towing of vehicles where the parking spot has not been paid for.

In view of the above discussion it should be appreciated that there is a need for improved parking systems and particularly parking systems which have benefits in the amount of hardware that needs to be deployed and maintained and/or the amount of human operators or technicians needed to keep the parking system functioning. In view of the above it should be appreciated that it would desirable if a parking system could be fully or significantly automated and/or avoid at least some of the disadvantages associated with using a ticket system and/or a separate parking meter at each individual parking spot.

SUMMARY

Various features relate to methods and apparatus relate to methods and apparatus for using wireless communication to facilitate implementation of a parking system while avoiding, at least in some embodiments, the need for physical tickets to be issued and/or a separate parking meter at each parking spot.

A customer premises parking system including one or more cameras and wireless commutations transmission capability is described. The presence of a vehicle with a license plate at an entrance or exit of a parking area is detected and one or more high resolution images are captured and time stamped. A license plate portion of the high definition (HD) image is captured and stored. The license plate number and corresponding time is determined and communicated using a wide area wireless network. The HD license plate portion of the image is processed to produce a low resolution version of the license plate image which is segmented and processed into fragments, e.g. blobs, which are transmitted via the wide area network using available transmission opportunities. A high resolution version of the license plate portion is stored at the premises where the parking facilitate is located and can be retrieved via a cellular wireless interface in the event of a dispute or discrepancy with regard to the detected and reported license plate number. From the time stamps associated with entrance and exit images of license plates the amount of time and/or date at which a vehicle was present at the parking garage is determined and the vehicle owner billed for the use of the parking facility.

By using a combination of different wireless interfaces, a parking facility can communicate timely information over a wide area network such as an Long Range Wide Area Network (LoRaWAN) which allows for tracking use of the parking facility without the need for tickets or on site persons to accept payments deal with the potential loss of tickets used to track use of the parking garage and control the garage exit.

Because high resolution images of license plates are stored and available in the event of a disputed charge for services, the system provides a reliable record of a parking facility use without the need to transmit the high resolution images in the majority of cases. Furthermore by storing license plate portions of images, rather than entire images, a degree of privacy can be maintained in at least some embodiments since images of the vehicle occupants need be retained and are not retained in at least some embodiments.

Since the wide area network, e.g. LoRaWAN, is used to communicate the information used to track parking facility utilization in most cases, and cellular communication of images can be limited to applications where garage use is in dispute or there is a problem interpretation a license plate number, costs can be keep low since in such embodiments use of relatively costly cellular resources is rather limited. The methods and apparatus described herein can be used to implement parking facilities without the need for dedicated wired communication to a central billing system and without the need for a large number of parking lot attendants or service staff. Accordingly as compared to ticket based access control systems the parking systems described herein offer many hardware and labor saving advantages while allowing for real time and/or near real time billing for use of a parking lot or garage.

An exemplary method for tracking use of a parking facility, in accordance with some embodiments, comprises: capturing, at an entrance or exit of a parking facility, a first image including a license plate portion which includes a license plate number, said first image being at a first resolution; extracting the license plate number from the first image; and communicating to an application server, via a wide area wireless communications network, the license plate number and a time stamp.

An exemplary system for tracking use of a parking facility, in accordance with some embodiments, comprises: a camera for capturing, at an entrance or exit of a parking facility, a first image including a license plate portion which includes a license plate number, said first image being at a first resolution; and an edge compute platform coupled to said camera, said edge compute platform including a first processor configured to control the edge compute platform to: extract the license plate number from the first image; and communicate to an application server, via a wide area wireless communications network, the license plate number and a time stamp.

While various features discussed in the summary are used in some embodiments it should be appreciated that not all features are required or necessary for all embodiments and the mention of features in the summary should in no way be interpreted as implying that the feature is necessary or critical for all embodiments. Numerous additional features and embodiments are discussed in the detailed description which follows. Numerous additional benefits will be discussed in the detailed description which follows.

DETAILED DESCRIPTION

Figure 1:
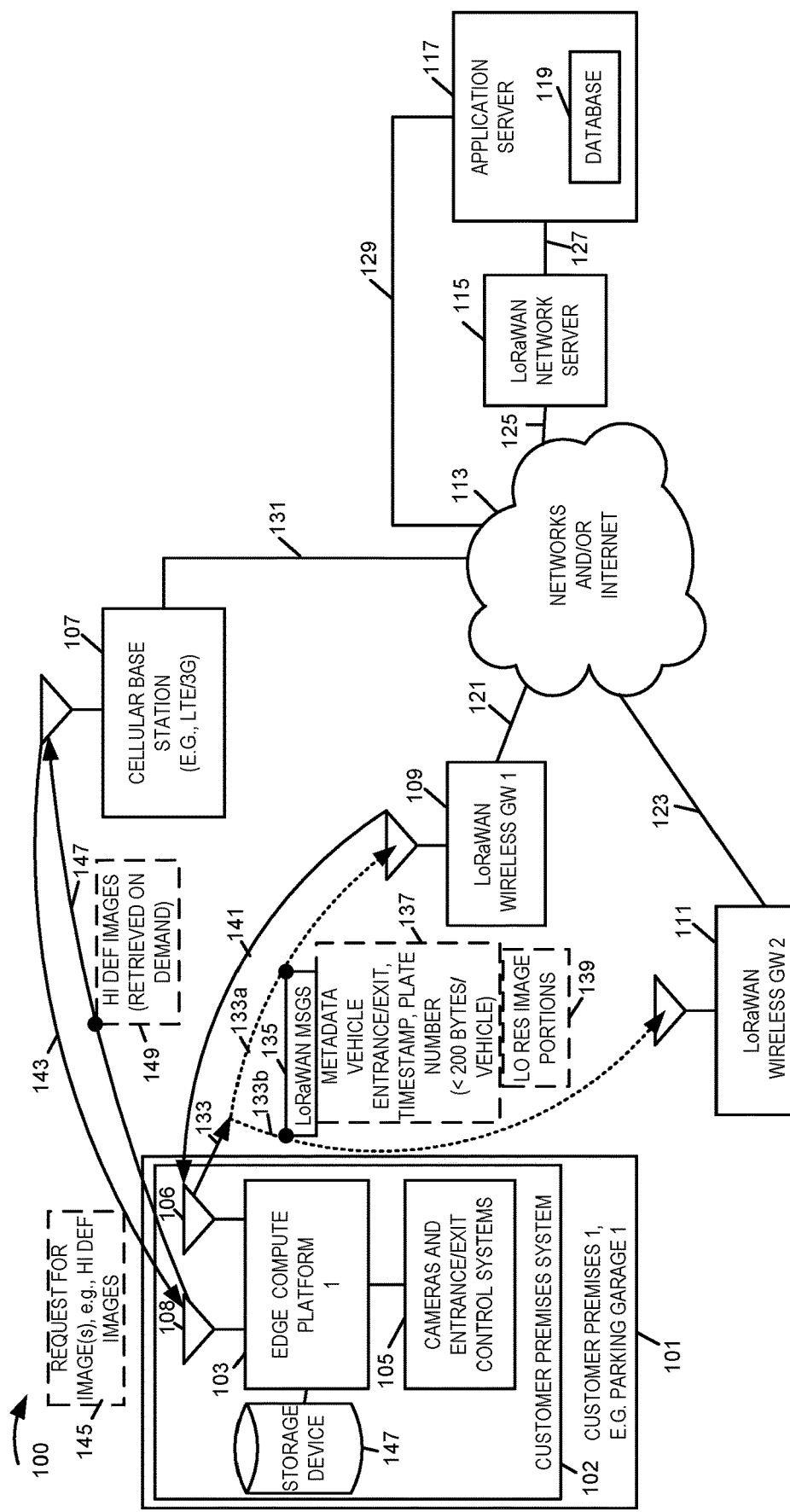
FIG. 1 is a drawing of an exemplary system, including a customer premises which serves as a parking site, e.g., a parking garage, said customer premises including a customer premises system including an edge compute platform and a cameras and entrance/exit control system, and a remotely located applications server, said customer premises system and said application server implemented in accordance with the invention.

FIG. 1 is a drawing of an exemplary system 100 in accordance with an exemplary embodiment. Exemplary system 100 includes a customer premises system 102, e.g., a parking garage system, a cellular base station 107, a plurality of LoRaWAN gateways (LoRaWAN GW 1 109, LoRaWAN GW 2 111), networks and/or the Internet 113, a LoRaWAN network server 115, and an application server 117 coupled together as shown. Customer premises system 102, e.g. a parking garage system for monitoring and reporting parking related information including license plates, is located at customer premises 1 101, e.g., parking garage 1. The customer premises system 102 includes edge compute platform 1 103, a storage device 147, and cameras and entrance/exit control systems 102.

Cameras and entrance/exit control system 105 detects vehicles at entry and exit points using cameras and/or proximity sensors and photographs the detected vehicles, e.g., capturing one or more images of the rear and/or front license plates of the vehicle. Edge compute platform 103 processes the received images, e.g. attempting to determine the vehicle license plate number from one or more captured images, cropping images, generating low resolution images, and generating low resolution image portions. Edge compute platform 103 also collects and records data to be associated with images, e.g., camera ID number, time tag (date and time), entry or exit ID number, etc. Edge compute platform 103 stores images and data in storage device 147, e.g., to be used to generate LoRa messages (e.g., conveying a small data set corresponding to a detected vehicle including a plate number and/or a low resolution image of the plate) and/or to communicate high resolution images (and corresponding information) at a later time on demand.

Cellular base station 107, e.g., an LTE/3G base station, is coupled to communications networks and/or the Internet 113 via backhaul communications link 131. LoRaWAN GW 1 109 is coupled to networks and/or the Internet 113 via communications link 121. LoRaWAN GW 2 111 is coupled to networks and/or the Internet 113 via communications link 123. The LoRaWAN network server 115 is coupled to networks and/or the Internet 113 via communications link 125. The LoRaWAN network server 115 is coupled to application server 117 via communications link 127. The application server 117 includes a database 119. The edge compute platform 103 may be, and sometimes is, coupled to cellular base station 107 via cellular interface antenna(s) 108 and a wireless cellular communications link. The edge compute platform 103 may be, and sometimes is, coupled to one or both of LoRaWAN wireless gateways (109, 111) via LoRaWAN antenna(s) 106 and wireless communications links.

Edge compute platform 103 generates and transmits LoRaWAN uplink broadcast signals 133. The LoRaWAN broadcast signals 133 convey LoRaWAN messages 135. An exemplary LoRa message 137 includes metadata, a vehicle entrance/exit ID number, a timestamp, and a plate number. In some embodiments message 137 is generated and transmitted in response to a vehicle being detected and photographed at an entrance or exit of the parking garage. In some embodiments, the set of information corresponding to a detected vehicle which is communicated is less than 200 bytes.

Another type of exemplary LoRa message 139, which is communicated, when convenient, e.g., when the LoRa communications channel is available, includes a low resolution image portion of a detected license plate. In some embodiments, a set of LoRa messages 139 are transmitted, e.g., each message including a different low resolution image portion of the detected plate.

The LoRaWAN signals 133, can be, and sometimes are, received by one or multiple LoRaWAN GWs, e.g., depending upon channel conditions, power levels, etc. If a GW successfully receives the LoRaWAN message, the GW forwards the message toward the LoRaWAN network server 113. LoRa WAN network server 115 receives messages from the GWs (109, 123) along with metadata, e.g. Signal to Noise Ratio (SNR), received signal strength, etc. corresponding to the received signals. The network server 115 selects a GW to use for downlink to the edge compute platform 103, e.g. based on the communicated SNR and/or signal strength.

In this example, exemplary LoRa wireless signals 133 conveying LoRa messages 135 are being successfully received and forwarded by both GW 1 109 and GW 2 111, as indicated by dashed line arrows 133a and 133b, respectively. In this example, network server 115 has selected to use GW 1 109 for the LoRaWAN downlink to edge compute platform 103, as indicated by arrow 141.

The LoRaWAN network server receives the messages 137, 139, and forwards the recovered information to application server 117, which receives and stores the information in its database 119. The application server 117 also generates a composite low resolution image for a license plate from multiple received image portions (from multiple messages 139), e.g., stitching together a set of image portions to recover a single low resolution image of a license plate.

The application server 117, may, and sometimes does, send a request for one or more high definition images, which are stored in customer premises system 102, e.g., in storage device 147. A request for high definition images, generated by application server 117 is sent to the edge compute platform 103, via the cellular communications base station 107. Exemplary cellular downlink signals 143 convey a request 145 for high definition images, e.g., corresponding to a particular entry/exit ID, timetag and/or license plate number. Exemplary uplink cellular signals 147 convey high definition image(s) 149, which were retrieved on demand. The base station 149 receives the wireless cellular uplink signals 147, recovers the image(s) 149, generates and sends message(s) to the application server 117 communicating the requested image(s).

Figure 2:
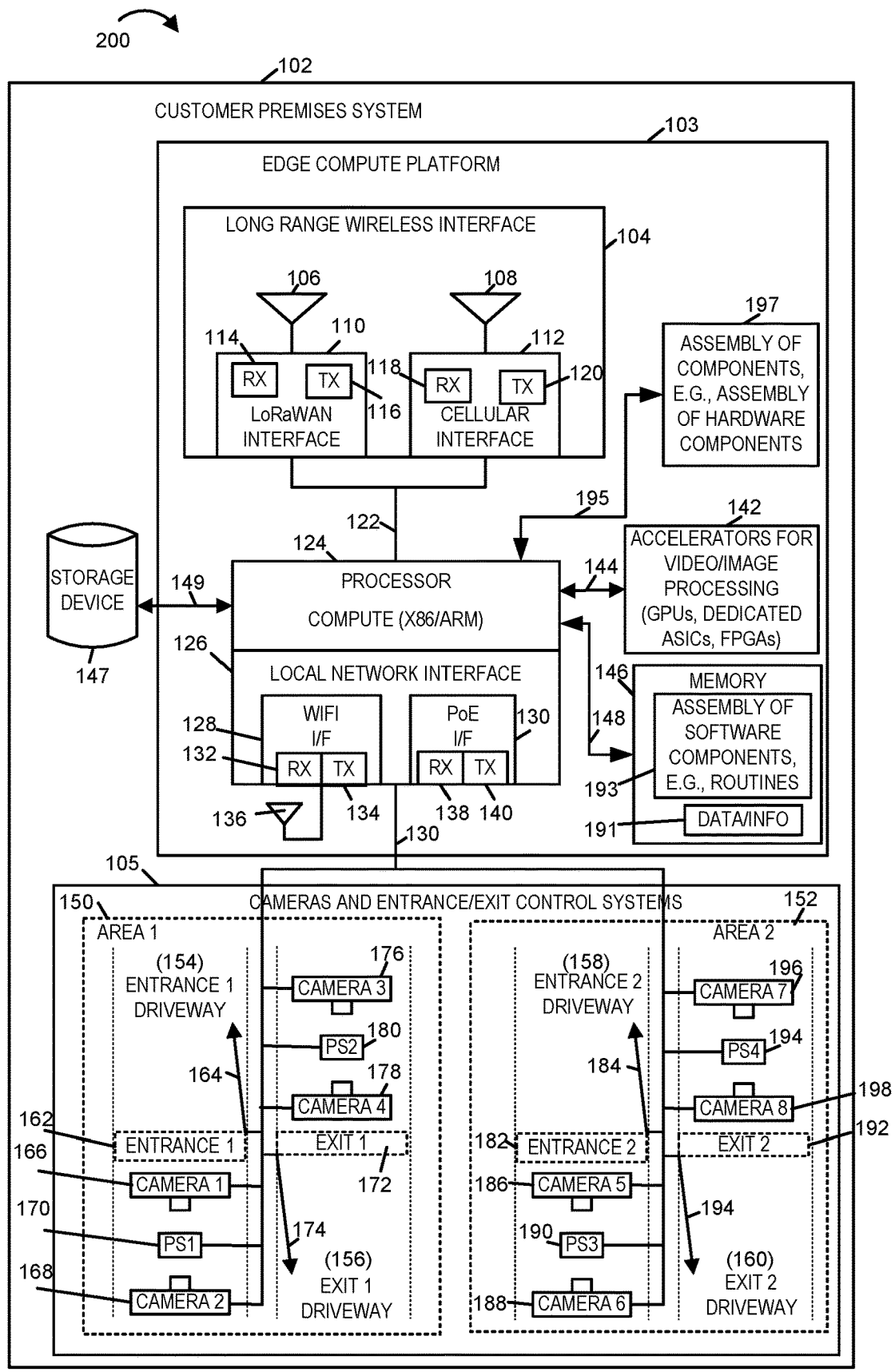
FIG. 2 shows an exemplary customer premise system, e.g., a parking garage system, which can be used in the system of FIG. 1.

FIG. 2 is a drawing 200 illustrating customer premises system 102 of FIG. 1, in more detail, and further illustrating exemplary areas (entry and exit areas), exemplary gates, and exemplary positions of cameras and proximity sensors in the parking garage site.

Customer premises system 102 includes edge compute platform 103, storage device 147, and cameras and entrance/exit control system 105 coupled together as shown. Edge compute platform 103 includes a long range wireless interface 104, a processor 124, e.g., a compute (X86/ARM), accelerators 142 for video/image processing, e.g. Graphics Processing Units (GPUs), Application-Specific Integrated Circuits (ASICs), and/or Field-Programmable Gate Arrays (FPGAs), memory 146, a local network interface 126, and assembly of components 197, e.g., an assembly of hardware components, e.g. an assembly of circuits. Assembly of hardware component 197 is coupled to processor 124 via bus 195. Memory 146 is coupled to processor 124 via bus 148. Memory 146 includes an assembly of software components 193, e.g. routines, and data/information 191.

Long range wireless interface 104 includes a LoRaWAN interface 110 and a cellular interface 112. LoRaWAN interface 110 includes a wireless receiver 114 and wireless transmitter 116. LoRaWAN interface 110 is coupled to antenna(s) 106. Cellular interface 112 includes a wireless receiver 118 and wireless transmitter 120. Cellular interface 112 is coupled to antenna(s) 108.

Local network interface 126 includes a WiFi interface 128 and a Power over Ethernet (PoE) interface 130. WiFi interface 128 includes a wireless receiver 132 and a wireless transmitter 134, coupled to antenna 136, via which the edge compute platform 103 receives and transmits WiFi signals from/to various devices, e.g., cameras, proximity sensors, gates, etc., which use WiFi signaling for communications and are located in the parking garage area and/or adjacent local areas. PoE interface 130 includes a receiver 138 and a transmitter 140, via which the edge compute platform 103 receives and send messages from/to various devices, e.g., cameras, proximity sensors, gates, etc., which are coupled to the PoE interface 130 and are located in the parking garage area and/or adjacent local areas.

Long Range wireless interface 104 is coupled to processor 124 via link 122. The external storage device 147 is coupled to the processor 124 via bus 149. Internal edge compute platform memory 146 is coupled to processor 124 via bus 148. The accelerators 142 are coupled to processor 124 via links 144. The processor 124 is also coupled to local network interface 126. Connections 130 illustrates that the local network interface 126 coupled the edge compute platform 103 to the various components in the camera and entrance control system 105 including: cameras (camera 1 166, camera 2 168, camera 3 176, camera 4 178, camera 5 186, camera 6 188, camera 7 196, camera 8 198)), proximity sensors (PS 1 170, PS 2 180, PS 3 190, PS 4 194)) and controllable gates (gate 1 164, gate 2 174, gate 3 184, gate 4 194). In some embodiments connection line 130 is used to represent one of WiFi connections or PoE connections. In some other embodiments, connection line 130 is used to represent both WiFi connections and PoE connections, with some devices using a WiFi connection to WiFi I/F 128 and other devices using a PoE connection to PoE interface 130.

Proximity sensor 1 170 is used to detect the presence of a vehicle in entrance 1 driveway 154. Camera 1 166 is used to capture images of the front license plate of a vehicle entering the entrance 1 driveway 154 of area 1 150. Camera 2 168 is used to capture images of the rear license plate of a vehicle entering the entrance 1 driveway 154 of area 1 150. Controllable gate 1 164 controls access through entrance 1 162.

Proximity sensor 2 180 is used to detect the presence of a vehicle in exit 1 driveway 156. Camera 3 176 is used to capture images of the rear license plate of a vehicle leaving the exit 1 driveway 156 of area 1 150. Camera 4 178 is used to capture images of the front license plate of a vehicle leaving the exit 1 driveway 156 of area 1 150. Controllable gate 2 174 controls access through exit 1 172.

Proximity sensor 3 190 is used to detect the presence of a vehicle in entrance 2 driveway 158. Camera 5 186 is used to capture images of the front license plate of a vehicle entering the entrance 2 driveway 158 of area 2 152. Camera 6 168 is used to capture images of the rear license plate of a vehicle entering the entrance 2 driveway 158 of area 2 152. Controllable gate 3 184 controls access through entrance 2 182.

Proximity sensor 4 194 is used to detect the presence of a vehicle in exit 2 driveway 160. Camera 7 196 is used to capture images of the rear license plate of a vehicle leaving the exit 2 driveway 160 of area 2 152. Camera 8 198 is used to capture images of the front license plate of a vehicle leaving the exit 2 driveway 160 of area 2 152. Controllable gate 4 194 controls access through exit 2 192.

Figure 3:
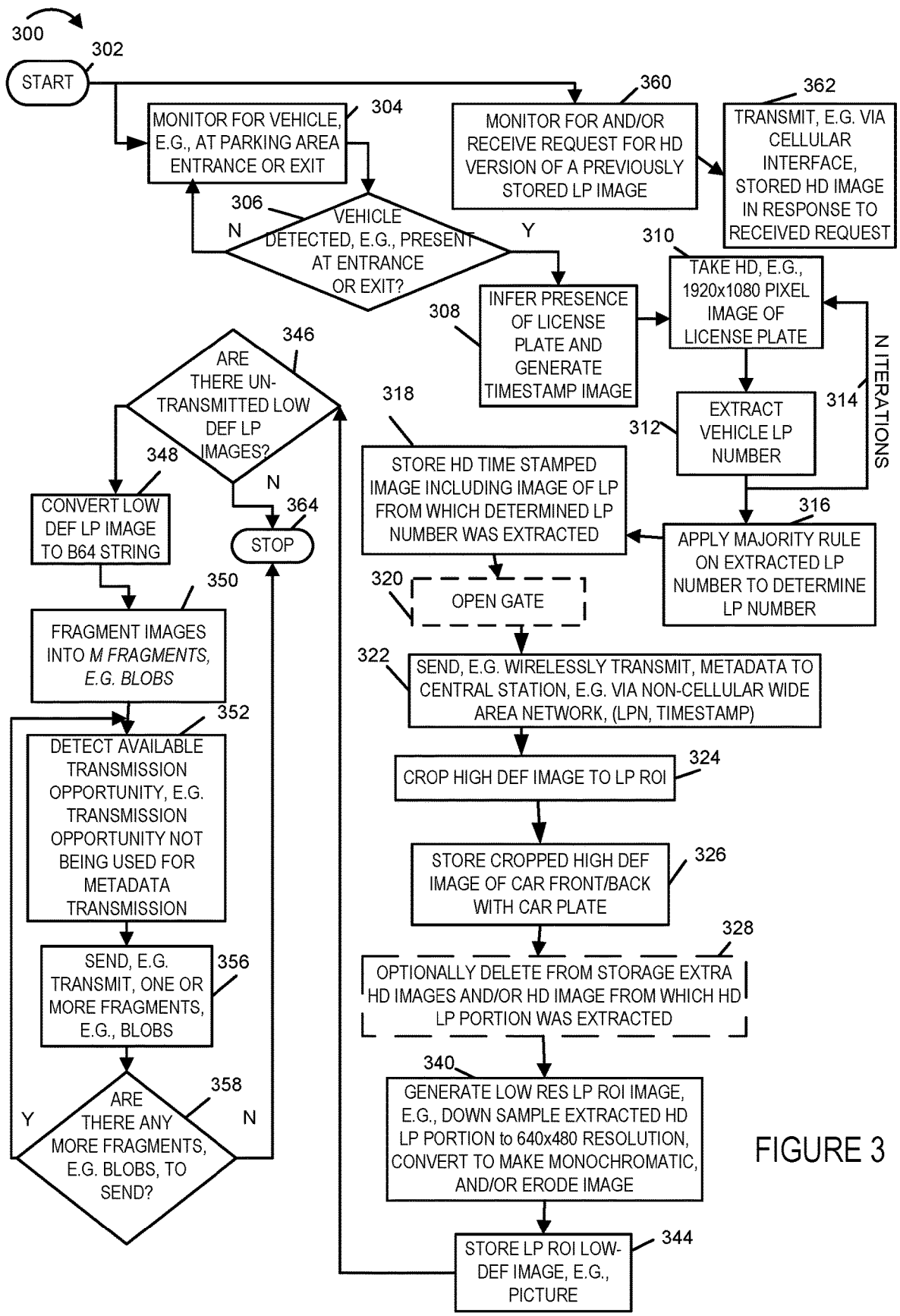
FIG. 3 illustrates an exemplary method implemented in a parking system, e.g., the customer premises system shown in FIG. 2, in accordance with one exemplary embodiment.

FIG. 3 illustrates an exemplary method 300 of operating a customer premises system, such as the system 102, shown in FIGS. 1 and 2 to capture license plate information along with entry/exit time information and to communicate such information to an application server 117 via, e.g., a first wireless communications network such as a wide area network or a second communications network such as a cellular communications network or a wired or fiber network. In some embodiments the first wireless network is a LoRaWAN. The application server then uses the received information to track usage of one or more parking facilities and to bill customers for use of the parking facilities, e.g., garage or garages, based on entry and exit times of vehicles corresponding to a user where license plate numbers are used to determine which user a vehicle corresponds to and thus should be billed for use of the parking garage.

The method 300 shown in FIG. 3 starts in step 302 with the components of the customer premises system 102 being powered on. Operation proceeds from step 302 to steps 304 and 360 which can be performed in parallel and on an ongoing basis. In step 302 the customer premises system 102 under the direction of the processor in the edge compute platform 103, monitors to detect a vehicle, e.g. a vehicle with a license plate at an entrance or exit to a parking area. Proximity sensors (PS 1 170, PS 2 180, PS 3 190, PS 4 194)) can be, and sometimes are, used to perform the detection function and to trigger time stamping and/or image capture.

The output of the proximity sensors is monitored in step 304, and in step 306 a determination is made as to whether a vehicle is detected, e.g., whether a vehicle has been determined to be present at an entrance or an exit. If a vehicle is determined to be present at an entrance or exit in step 306, operation proceeds to step 308 in which the presence of a vehicle is inferred from the sensor output and a timestamp is generated. Operation then proceeds to step 310 in which an image is captured at a first resolution, e.g., a High Definition (HD) image including a portion of a vehicle where the license plate is located. In some embodiments the first resolution image is a 1920×1080 pixel image but other resolutions are possible, e.g., higher resolutions. While time stamp generation step 308 and image capture step 310 are shown as separate steps they may be performed together, e.g., by a camera which captures and generates an image which it also time stamps. Accordingly, it should be appreciated that the generated time stamp represents a time at which a vehicle was detected at the entrance or exit to the parking facility. Information about which camera which captured the image, and thus which entrance or exit the image was captured at may be embedded or associated with a captured image. Thus with each captured license plate image in some embodiments there is also time stamp information and information about which particular entrance or exit the image was captured at.

Operation proceeds from image capture step 310 to extract vehicle license plate (LP) number step 312. In step 312 the HD image including a license plate number captured in step 310 is processed to identify a license plate number. Optical character recognition (OCR) can be, and sometimes are, used to implemented step 312. Image capture step and LP number extraction step 312 are, in some but, not necessarily all, embodiments performed N times, where N is a number greater than 1 as represented by repeat arrow 314.

In embodiments where multiple images are captured and the LP number extracted, step 316 is used to determine the LP number by determining the number to be the LP number which was consistently determined in the majority of extraction operations. Thus the LP number which is used is one that is consistently determined in some embodiments and thus if for some reason an OCR operation erroneously determine an LP number on one occasion but determined the correct number on other occasions corresponding to the same entrance or exit detection event, the correct number will be reported and used as the LP number. In other embodiments where a single extraction operation is relied upon step 316 is skipped. However, by relying on consistently, e.g., majority rule determined LP number, greater reliability may be achieved as compared to embodiments where a single capture and OCR operation is relied upon to determine a LP number.

With a license plate number having been determined either from a single determination in step 316 or through use of a majority decision process in step 316 operation proceeds to step 318 in which the HD time stamped image of the LP which produced the determined LP number is stored, e.g., in memory 146 and/or data storage device 147. Along with the time stamp and HD image including the license plate number information indicating the entrance and/or exit where the image was captured may be, and sometimes is, also stored. From this information it is possible to determine if a license plate capture corresponds to a parking lot vehicle entrance event and/or exit event.

With the successful detection of a license plate number and storage of the corresponding image, in embodiments where a gate is used to restrict vehicles entering or leaving the parking facility, the gate corresponding to the area where the detection and image capture occurred is opened in step 320. It should be appreciated that step 320 is optional and that gates are not required or used in all embodiments. This is because vehicles can be detected and images captured without the need for a gate and charging for services will be based on the captured images and information and are thus not dependent on the use of a gate.

Operation proceeds from step 320 to step 322 or directly from step 318 to step 322 in those embodiments where gates are not used.

In step 322 the important information which can be used for tracking parking facility usage, such as license plate number information, the corresponding time stamp indicating an entry or exit time and/or information indicating the entrance or exit a vehicle was detected using is communicated wirelessly to the application server responsible for tracking use of parking resources, e.g., one or more parking garages or parking spaces. In various embodiments at least the time stamp (which normally includes date and time information) and the license plate information, sometimes referred to as metadata, is transmitted via a first wireless network, e.g., a wide area network such as a LoRaWAN, to the application server 117. Such communication may, and sometimes does, involve transmission of the metadata to a gateway 109 and/or 111 which forwards the metadata to the application server. Included with the metadata in some cases is data indicating the particular entrance and/exit to which the communicated time stamp and LP number correspond. Thus the application server can easily determine if the information corresponds to an entrance or exit event. In the case where entrance and exit information is not included in the metadata, the application can pair a first detection event with a later detection event to determine an entrance and exit time and date for a particular license plate number and thus parking garage user since for each entrance into the garage there should be a matching later exit from the garage.

The metadata can be sent using a few number of bits compared to the number of bits required to transmit image data. The metadata is treated as high priority data and given transmission priority, in some embodiments by the customer premises system, over the first network compared to the transmission of image data.

Operation proceeds from step 322 to step 324 in which the stored HD image including the LP from which the number was extracted is cropped to generate a HD image of the license plate region of interest (LP ROI). In this way people that may have been included in the original captured image can be eliminated from the image for privacy concerns and/or to reduce the amount of data that needs to be stored.

With a HD cropped version of the LP ROI having been generated in step 324, operation proceeds to step 326 where it is stored. As should be appreciated the cropped LP ROI can correspond to either a front or rear license plate of a vehicle, e.g., car, motorcycle or truck.

With a cropped HD image of the LP ROI having been stored along with the corresponding image metadata in step 326, operation proceeds to step 340 directly or via optional step 328. In step 328, in embodiments where it is implemented, extra HD images of the LP are deleted and/or even the original LP image from which the extracted HD LP ROI was generated is deleted. This is done depending on the embodiment for privacy reasons and/or to reduce data storage requirements. In such embodiment where step 328 is implemented the important license plate image is preserved while other image content which might raise privacy concerns is deleted.

The extracted HD LP ROI image may be represented by more data than is easily communicated over a first wireless network given other data to be transmitted and/or limits on how much data can be transmitted by the customer premise system 102 via the first wireless network during a time period. To allow transmission of some image data via the first wireless network, in step 340 a low resolution image is generated from the HD LP ROI image that was stored in step 326. The low resolution image has a second resolution which is lower than the first, e.g., HD image resolution. In some embodiments the low resolution image is a 640×480 or a 640×720 image. Other resolutions are also possible but will be lower than the initial capture resolution. Generation of the low resolution image includes, depending on the embodiment downsampling the HD LP ROI image and/or converting a color HD LP ROI image into a monochrome image. Depending on the embodiment the low resolution image generation step may and sometimes does include an image erosion operation. The result of step 340 is the generation of a low resolution LP ROI image which is stored in step 344. Information about available low resolution LP ROI images is provided to step 346 which marks the start of a low priority image transmission processes in which transmission opportunities over the first wireless network which are not used to communicate metadata are used to communicate low resolution image data to the application server via the first wireless network.

In step 346 a determination is made as to whether there are any untransmitted low definition LP ROI images to be transmitted, e.g., if there are any images that were stored in step 344 that were not already communicated to the application server. In step 346 if all the low definition (def) LP ROI images have been transmitted, operation proceeds to stop step 346 pending storage of another low def LP ROI which is to be transmitted.

However, if in step 346 it is determined that there is an untransmitted low def LP ROI to be transmitted, operation proceeds to step 348 where the low def LP ROI image to be transmitted is converted to one or more B64 (binary 64) strings. Then in step 350 the image data is processed, e.g., the image represented as B64 strings is fragmented, e.g., into M fragments where M is a positive integer. The fragments may be in the form of image BLOBS (Binary Large OBjects) where a BLOB refers to a group of connected pixels in a binary image.

Then in step 352 one or more available transmission opportunities are detected, e.g., one or more opportunities to transmit image data from the customer premises system which are not used for metadata are detected. These opportunities are useful for transmitting the lower priority image data over the first wireless network since they are available and not being used for the higher priority metadata transmitted in step 322.

In response to detecting a transmission opportunity in step 352 operation proceeds to step 356 in which one or more image fragments of a low def LP ROI image are transmitted. Operation then proceeds to step 358 in which a check is made to determine if there are any more image fragments, e.g., BLOBs, to be transmitted. If there are additional image fragments to be transmitted operation returns to step 352 to detect another transmission opportunity.

However, if there are no other image fragments to transmit operation proceeds to step 364 where transmission of low def images temporarily stops until a new low res LP ROI image is generated in step 340 and stored in step 344.

While cropped high def LP ROI images are generated by the customer premises system 102 and stored in the customer premises system memory 146 or storage device 147 they are not transmitted to the application server 117 in some embodiments unless explicitly requested, e.g., because of a billing dispute or license plate number challenge.

Monitoring step 360 is preformed on an ongoing basis. In step 360 the customer premises system monitors for and/or receives a request for one or more HD versions of stored LP ROI images or other stored HD images. In some embodiment the requests for HD images are received via the cellular interface 112 and responded to via the cellular interface. The cellular network, or a wired or optical network, is preferred and used in some embodiments to communicate the requested HD image content to the application server 117 where it can be stored and used, e.g., to support billing operations for parking services to users to which detected license plates correspond.

In step 362 the customer premise system 102 responds to a request for a stored HD image or images by transmitting the requested image, e.g., an HD LP ROI image to the application server 117 via the cellular network.

As should be appreciated the application server 117 uses the license plate, time and entry/exit information to track use of one or more parking facilities and to issue invoices to customers based on the collected information.

Various aspects and/or features of some embodiments of the present invention are further described below. Various embodiments are directed to autonomously managing a parking solution, e.g., for smart cities. In some embodiments include an edge computing solution plus a communications framework that allows full autonomous management of the parking. The solution, in some embodiments, is based on edge computer vision to retrieve car plates, count cars entering in/out of the parking structure and stored locally and remotely, e.g. in the cloud, relevant data on the number of available spots and automatically bill cars. An exemplary computer vision algorithm, used in some embodiments, is tuned to ensure a high success rate, e.g., over 95% accuracy, in recognizing car plates.

Various embodiments are directed to deploying, managing and/or commercializing autonomous parking solutions. An exemplary solution, in accordance with some embodiments of the present invention, is based on high accuracy low power imaging where the plate number is inferred with a high level of accuracy, e.g., over 95% accuracy, and a small set of useful information (metadata) such as, e.g., vehicle entrance/exit timestamp and plate number are sent over a low power wide area network (LPWAN) technology, e.g., LoRaWAN, to be stored remotely, e.g., in the cloud or in a dedicated server or dedicated database. In some embodiments, the small set of useful information which is communicated corresponds to less than 200 bytes per vehicle, resulting in less network congestion and less total cost of ownership (TCO) and Operational expenditures (Opex) per deployment, as compared to traditional approaches, which rely on high bandwidth solutions, e.g., high bandwidth wireless solutions including sending full pictures (e.g. high resolution uncropped images) including plate numbers over LTE, 3G to a cloud for processing in the cloud or high bandwidth wired solutions including sending full pictures including plate numbers to the cloud for processing in the cloud. Thus various embodiments, in accordance with the present invention (which communicate relatively small amounts of information per vehicle), do not have the drawback of high TCO and Opex of the traditional approaches which generate gigabytes and terabytes of data which are communicated to the cloud. Also, some embodiments implemented in accordance with the present invention, are not ticket based, e.g., no physical paper ticket is generated, used, printed, recovered, and/or processed, as is still the case in many traditional parking management approaches. Thus the new approach eliminates the need and cost associated with acquiring and maintaining such ticket generating and processing equipment.

Various implementations, in accordance with the present invention have value to a communications operator or service provider because: i) this approach enables more businesses to be able to deploy and enable operations with communications over low power wide area networks, e.g., LoRaWAN and Internet of Things (IoT); ii) this approach enables new revenue streams thru autonomous applications; and iii) this approach enables more offering to smart cities request for proposal (RFP) and request for information (RFI).

Various features and/or aspects of some embodiment of the present invention with regard to an exemplary implemented hardware (HW) platform, e.g. implemented at the customer premises (e.g., parking garage site), will now be described. In some embodiments, the implementation includes a customer premises system, e.g. customer premises system 102 shown in FIGS. 1 and 2. In some embodiments, the customer premises system 102 includes and edge compute platform, e.g., edge compute platform 103, coupled to a cameras and entrance/exit control system, e.g. cameras and entrance/exit control system 105. In some embodiments, the customer premises system includes the following subsystems: i) a complex instruction set computing (CISC), e.g., X86, CPU architecture device (processor) or a Reduced Instruction Set Computing (RISC), e.g., ARM, CPU architecture device (processor), e.g., CPU 124, ii) one or more accelerators, e.g., FPGAs, GPU, and/or dedicated ASICs, for the video/image processing, e.g., accelerators 142; on device storage, e.g., memory 146 and storage device 147; and cameras (e.g., cameras 166, 168, 176, 178, 186, 188, 196, 198) for the entrance/exit of the parking lot/structure.

Various features and/or aspects of some embodiment of the present invention with regard to an exemplary implemented software (SW) platform, e.g. implemented at the customer premises (e.g., parking garage site), will now be described. In some embodiments, the exemplary method includes two branches: i) time sensitive operations and ii) delay tolerant operations.

Exemplary time sensitive operations will now be described. A vehicle, positioned at the entrance/exit of the parking lot or parking garage, is detected, e.g. by one or more video cameras and/or one or more proximity sensors. The vehicle license plate number (LPN) is inferred. In order to make a robust, e.g. high accuracy, (e.g., >95% accuracy) inference of the LPN, as compared to a lower, e.g. 66% accuracy use a stock automated license plate reader (ALPR) algorithm, in accordance with a feature of some embodiments of the present invention, N successive photos of the front/back of the vehicle are captured and used to look-up in the photos the LPN through computer vision and machine learning (ML) algorithms, where N is a number greater than 1. In some embodiment the value is N is set and/or adjusted by the ML. In various embodiments, a vehicle LPN is extracted from each of the N captured images. Taking multiple photos reduces the probability of false detection and makes the system immune to car miss-position and blurry images (while the car is still in movement).

In accordance with a feature of some embodiments of the present invention, a majority rule is applied over the N LPNs obtained from the N captured photos of the plates corresponding to the vehicle to obtain a final license plate number (LPN); and the final license plate number is sent, e.g., via a communication path including low power wide area network wireless communications, e.g., LoRaWAN communications, for a portion of the path, to a back-end system, e.g., back-end system including an application server, with a time stamp appended to it.

In some embodiments, one of the high resolution images, e.g. 1080p images, corresponding to the final LPN, is stored appended with the timestamp and vehicle inferred LPN for eventual future use, e.g., in case of litigations. From the stored image the implemented ALPR method, in accordance with a feature of some embodiments of the present invention, extracts the license plate number (LPN) region of interest (ROI), e.g., the portion of the captured image including the license plate is extracted using cropping of the captured image. The LPN ROI image (image portion including the license plate) is then converted to lower image quality, converted to be a monochromatic (white and black) image and eroded, e.g., shrunk. Thus from a very high quality image, processing, in accordance with the present invention is performed to generate an image small enough but including all the needed information to be sent. This low resolution relatively small monochromatic image is stored to be later sent over the low power wide area network, e.g., LoRaWAN network.

Figure 4:
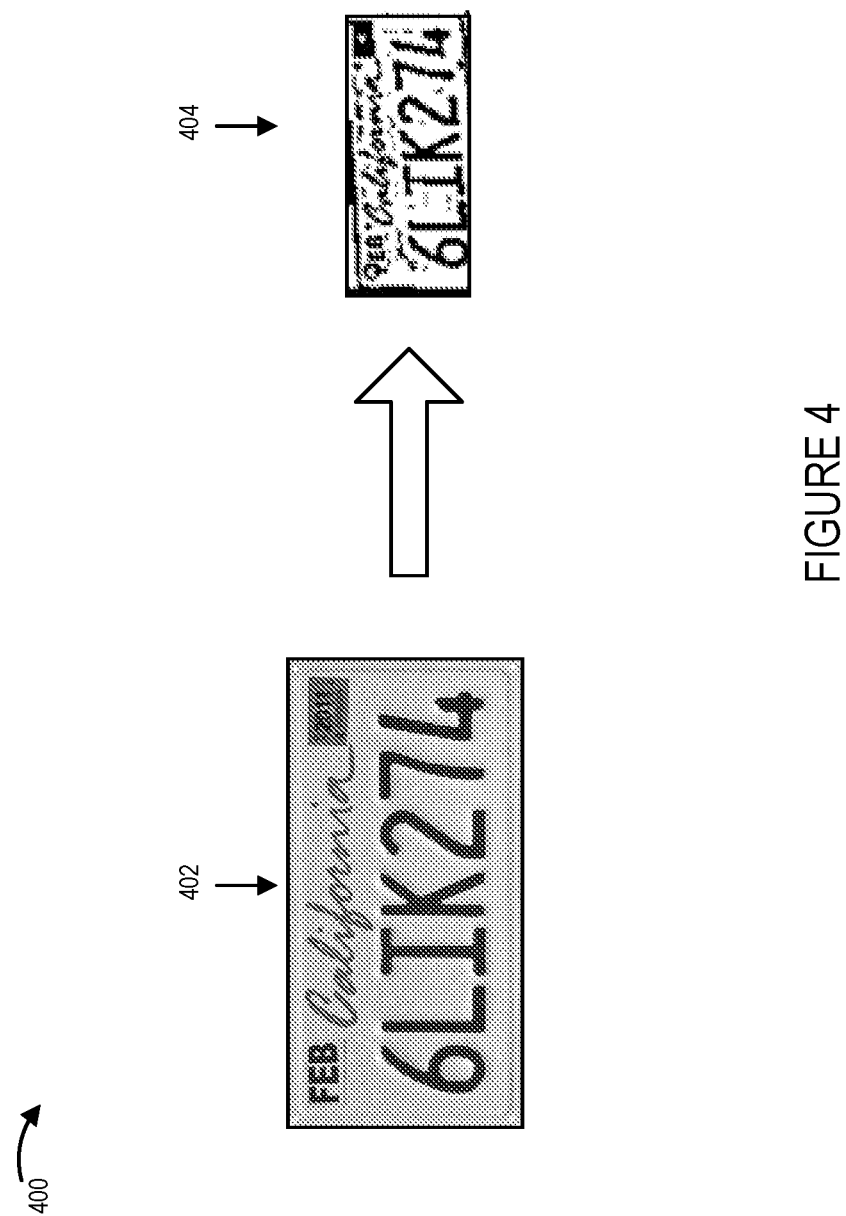
FIG. 4 is a drawing illustrating a high quality image of a license plate and a corresponding low quality image of the license plate, said low quality image generated from said high quality image, in accordance with an exemplary embodiment.

FIG. 4 is a drawing 400 illustrating a very high quality image 402 and a corresponding low quality image 402, in accordance with an exemplary embodiment. The high quality image 402 is, e.g., a high resolution color image, which is a cropped image of a captured image from which the LPN was obtained. The corresponding low quality image 404 is a low resolution version of the high quality image, e.g. after downsampling, conversion from color to monochrome, and/or erosion operations were performed.

Exemplary delay tolerant operations will now be described. Delay tolerant operations, in accordance with some embodiments of the present invention, include send ROI LPN low resolution images over low power wide area network, e.g., over LoRaWAN. This operation of sending a low resolution image is deprioritized operation, as on the time-sensitive branch of the exemplary method, the license plate number (LPN) and the timestamp were already sent to the back-end system, e.g. with low latency, e.g., <1 second, after the vehicle pull-in at the parking entrance/exit.

In some embodiments, a LPN low resolution image is converted from a JPEG file to base64 string and is split over M portions, e.g. blobs, to be sent over the low power wide area network, e.g., over LoRaWAN. In some embodiments, each of the M portions is sent via a different message, and each of the messages are send until the full set of messages is received by the back-end system.

The back-end, with respect to some embodiments, in accordance with the present invention, will now be described. The low power wide area network, e.g., LoRaWAN, messages are send by the edge compute node, e.g., edge compute platform node 103 of FIGS. 1 and 2, and received by different GWs, e.g., LoRaWAN GW 1 109 and LoRaWAN GW 2 111, of FIG. 1, and forwarded to the network server (NS), e.g., LoRaWAN network server 115 of FIG. 1, and then to an application server, e.g. application server 117 of FIG. 1.

The application server stores each of the messages received by the NS in its database, e.g., database 119 of FIG. 1. Each car can be visualized by is LPN, and as the application server has a set of information corresponding to each car at entry and/or exit time including timestamps, Business Support Systems (BSS) algorithms can be, and sometimes are, run to automatically bill each car and keep an accurate count of the number of available slots in the parking lot/structure.

Figure 5:
FIG. 5 is a drawing of an exemplary table of displayed and stored data available at the back-end, e.g., at the application server, in accordance with an exemplary embodiment.

FIG. 5 is a drawing of an exemplary table 500 of a displayed and stored data available at the back-end, e.g., at the application server 117, in accordance with an exemplary embodiment. First row 502 includes license plate numbers (LPNs), second column 504 includes timestamps, third column 506 includes data and time information derived from the timestamps, and fourth column 508 includes low resolution images of the license plates.

In various embodiments, full high definition images are, e.g., corresponding to each of the low definition images of table 500, are keep and stored in the customer premises system, e.g., in storage device 147 and/or memory 146 of customer premises system 102. In some embodiments, these high resolution images can be, and sometimes are, retrieved on demand, e.g., using an LTE/3G modem, in case of litigation.

In some embodiments, files are deleted in the customer premises system, e.g. customer premises system 102, after each payment is validated, e.g. records and stored images corresponding to an interval of parking at the parking garage corresponding to a vehicle are deleted from storage device 147 and memory 146 upon payment validation.

Figure 6:
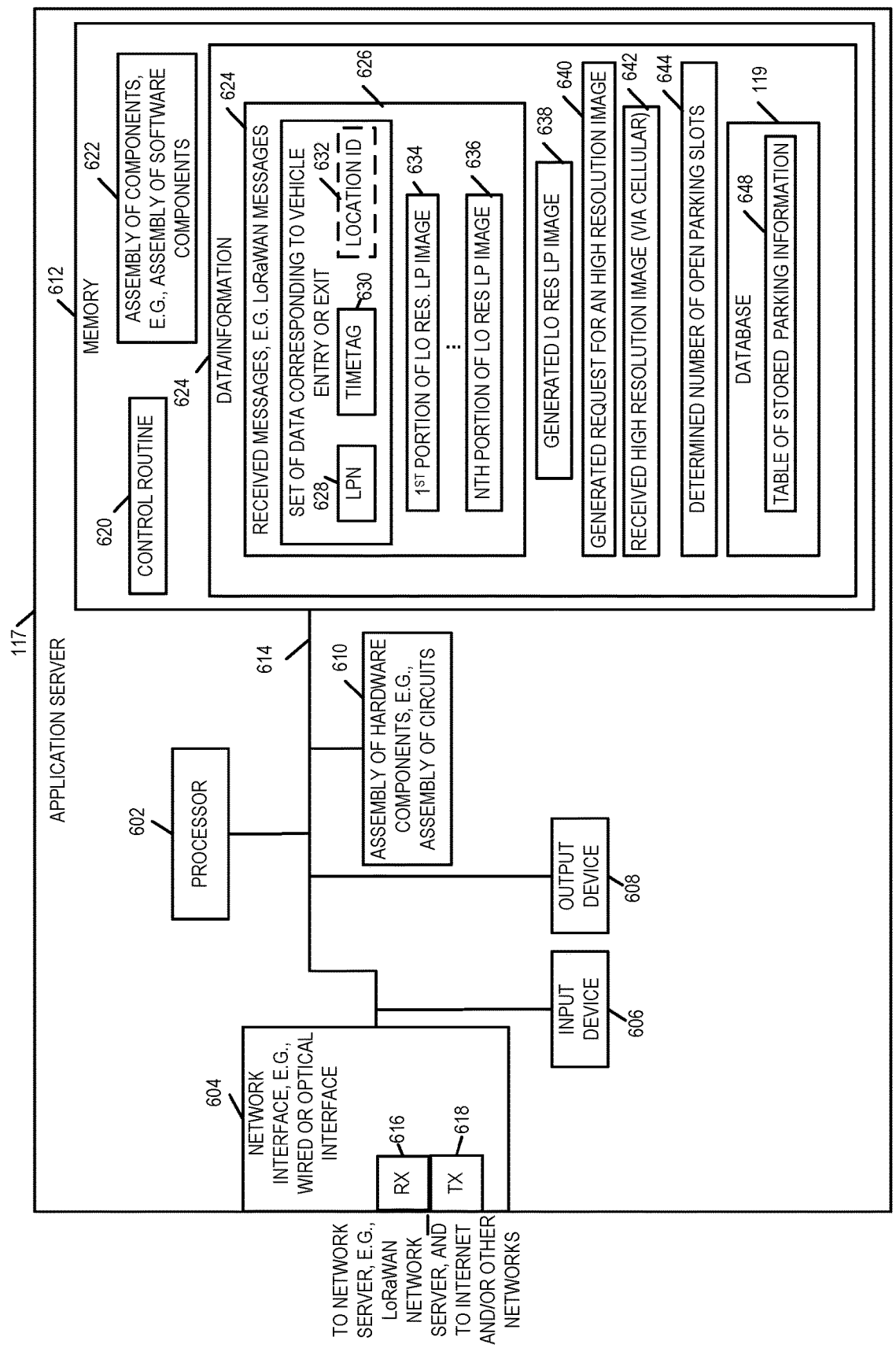
FIG. 6 is a drawing of an exemplary application server in accordance with an exemplary embodiment.

FIG. 6 is a drawing of an exemplary application server 117 in accordance with an exemplary embodiment. Exemplary application server 117 includes a processor 602, e.g., a CPU, a network interface 604, e.g., a wired or optical interface, an input device 606, e.g., keyboard, mouse, etc., an output device 608, e.g., a display, an assembly of hardware components 610, e.g., an assembly of circuits, and memory 612 coupled together via a bus 614 over which the various elements may interchange data and information.

Network interface 604 includes a receiver 616 and a transmitter 618. The network interface 604 couples the application server 117 to a network server, e.g., a LoRaWAN network server, and to the Internet and/or other networks, e.g., cellular communications network and LoRaWAN networks, etc.

Memory 612 includes a control routine 620 for control operation of the application server 117, an assembly of components 622, e.g., an assembly of software components, e.g., routines, subroutines, software modules, etc., and data/information 624. Data information 624 includes received messages 624, received LoRa WAN messages 624. Received messages 624 includes a message 626 conveying a relatively small set of data corresponding to a detected vehicle entry or detected vehicle exit at a parking garage or parking lot, and a plurality of messages, each message conveying a portion of a low resolution license plate image (1st portion of low resolution license plate image 634, . . . , Nth portion of low resolution license plate image) 634. Set of data corresponding to detected vehicle entry or exit includes a license plate number (LPN) 628, a timetag 630, and, in some embodiments, location ID 636, e.g., identifying the particular exit or entrance at the parking lot or parking garage at which the vehicle was detected. Data/information 624 further includes a generated low resolution license plate image 638, e.g., a generated from combining received image portions (634, . . . , 636), a generated request for a high resolution image 640, e.g., to be sent via cellular communications path, a received high resolution image 642, e.g., communicated via a cellular communications path, a determined number of currently open (available) parking slots 644 at the parking garage or parking lot, and a database 119 including a table of stored parking information 648, e.g., exemplary table 500 of FIG. 5.

Figure 7:
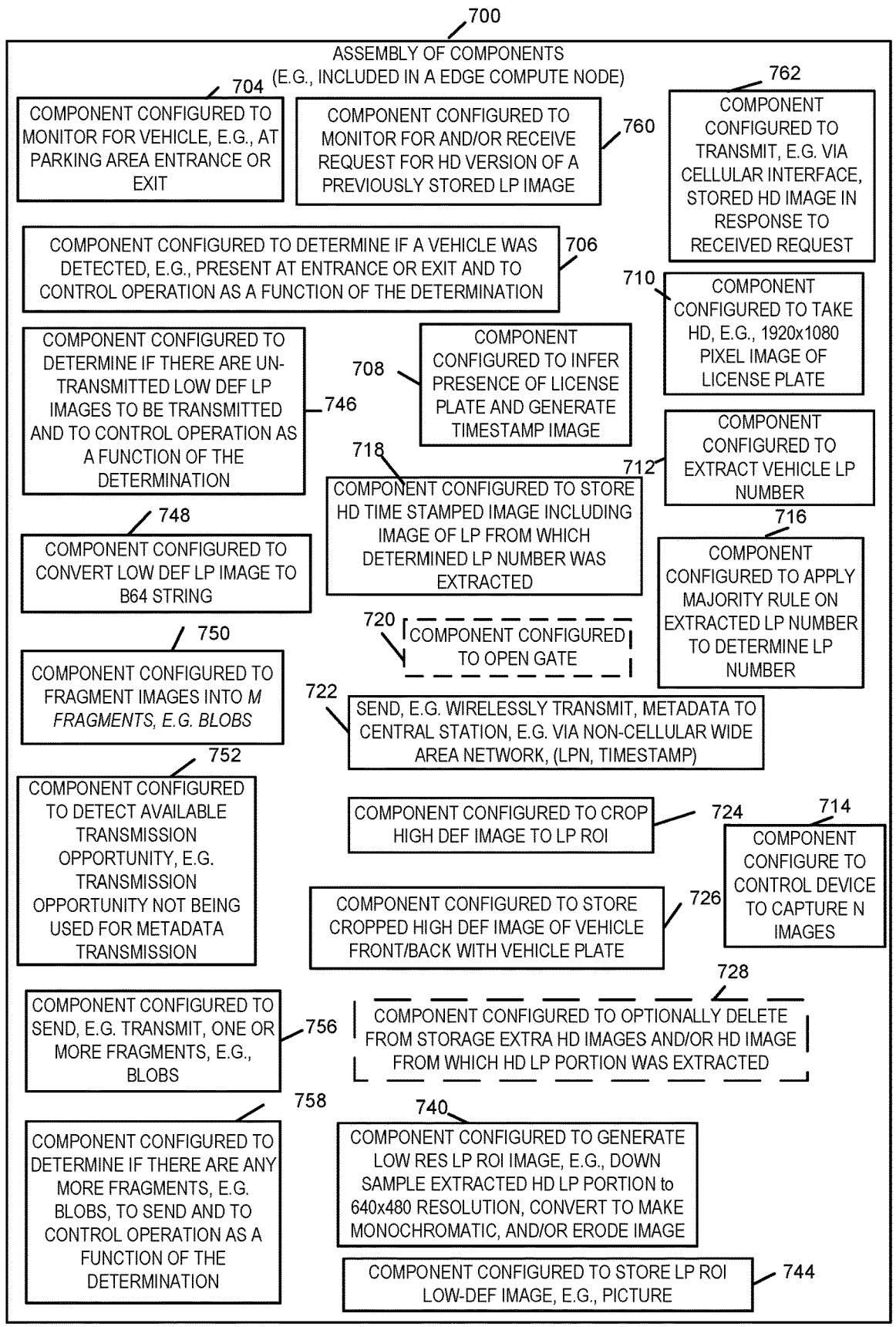
FIG. 7 is drawing of an exemplary assembly of components which may be included in an edge compute device, e.g., edge compute platform, in accordance with an exemplary embodiment.

FIG. 7 is drawing of an exemplary assembly of components 700 which may be included in an edge compute device, e.g., edge compute platform 103, in accordance with an exemplary embodiment.

The components in the assembly of components 700 can, and in some embodiments are, implemented fully in hardware within a processor, e.g., processor 124, e.g., as individual circuits. The components in the assembly of components 700 can, and in some embodiments are, implemented fully in hardware within the assembly of hardware components 197, e.g., as individual circuits corresponding to the different components. In other embodiments some of the components are implemented, e.g., as circuits, within processor 124 with other components being implemented, e.g., as circuits within assembly of components 197, external to and coupled to the processor 124. As should be appreciated the level of integration of components on the processor and/or with some components being external to the processor may be one of design choice. Alternatively, rather than being implemented as circuits, all or some of the components may be implemented in software and stored in the memory 146 of the edge compute platform 103 of customer premises system 103, with the components controlling operation of customer premises system 102 to implement the functions corresponding to the components when the components are executed by a processor e.g., processor 124. In some such embodiments, the assembly of components 700 is included in the memory 146 as part of assembly of software components 193. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 124, configure the processor to implement the function corresponding to the component. In embodiments where the assembly of components 700 is stored in the memory 146, the memory 146 is a computer program product comprising a computer readable medium comprising code, e.g., individual code for each component, for causing at least one computer, e.g., processor 124, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the customer premises system 102 or elements therein such as the processor 124, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method, e.g., the method of flowchart 300 of FIG. 3.

Assembly of components 700 includes a component 704 configured to monitor for a vehicle, e.g., an a parking area entrance or exit, a component 706 configured to determine if a vehicle was detected, e.g., present at an entrance or exit and to control operation as a function of the determination, a component 708 configured to infer presence of license plate and generate timestamp image, a component 710 configured to take a high definition, e.g., 1920×1080 pixel image of license plate, a component 712 configured to extract a vehicle license plate (LP) number (LPN), a component 714 configured to control the device to capture N images e.g., corresponding to a detected vehicle entry or exit, e.g., where N is greater than one, a component 716 configured to apply a majority rule on extracted LP numbers (e.g., corresponding to the same detected vehicle entry or exit) to determine a (accurate) LP number, a component 718 configured to store a HD time stamped image including an image of the LP from which a the determined LP number was extracted, and a component 720 configured to open a gate.

Assembly of components 700 further includes a component 722 configured to send (e.g., wirelessly transmit), metadata (e.g., license plate number and timestamp, and (in some embodiments) vehicle entry/exit ID) directed to a central station (application server), e.g., via a non-cellular wide area network (e.g., LoRaWAN), a component 724 configured to crop a high definition image to obtain a license plate region of interest (LP ROI), a component 726 configured to store the cropped high definition image of the vehicle front/back with the vehicle license plate, and a component 728 configured to optionally delete from storage extra HD images and/or the HD image from which HD LP portion was extracted. Assembly of components 700 further includes a component 740 configured to generate a low resolution LP ROI image, e.g., a downsample an extracted HD LP portion to 640×480 resolution, convert from color to make monochromatic, and/or erode the image, and a component 744 configured to store the generated LP ROI low definition image, e.g. picture.

Assembly of components 700 further includes a component 746 configured to determine if there are untransmitted low definition LP images to be transmitted and to control operation as a function of the determination, a component 748 configured to convert a low definition LP image to a string, e.g., a B64 string, a component 750 configured to fragment images, e.g., a low resolution LP ROI image, into M fragments, e.g., M blobs, a component 752 configured to detect an available transmission opportunity, e.g. a transmission opportunity not being used for metadata transmission, a component 756 configured to send, e.g., transmit, one or more image fragments, e.g. blobs, and a component 758 configured to determine if there are any more image fragments, e.g. blobs, to send to toe control operation as a function of the determination.

Assembly of components 700 further includes a component 762 configured to transmit, e.g., via a cellular interface, a stored HD image in response to a received request, e.g., from the application server.

Figure 8:
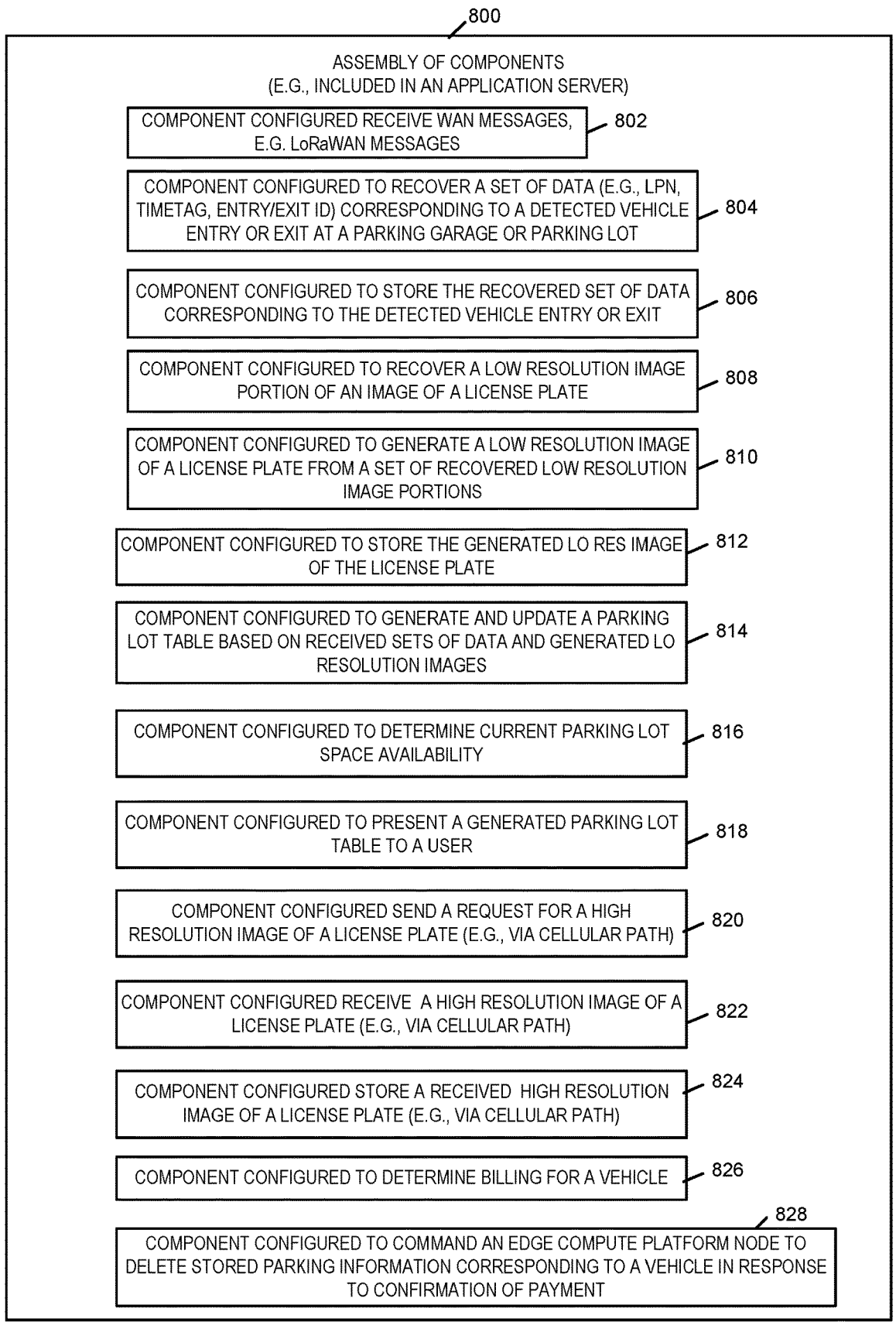
FIG. 8 is drawing of an exemplary assembly of components which may be included in an exemplary application server, in accordance with an exemplary embodiment.

FIG. 8 is drawing of an exemplary assembly of components 800 which may be included in an exemplary application server, e.g., application server 117, in accordance with an exemplary embodiment.

The components in the assembly of components 800 can, and in some embodiments are, implemented fully in hardware within a processor, e.g., processor 602, e.g., as individual circuits. The components in the assembly of components 800 can, and in some embodiments are, implemented fully in hardware within the assembly of hardware components 622, e.g., as individual circuits corresponding to the different components. In other embodiments some of the components are implemented, e.g., as circuits, within processor 602 with other components being implemented, e.g., as circuits within assembly of components 622, external to and coupled to the processor 602. As should be appreciated the level of integration of components on the processor and/or with some components being external to the processor may be one of design choice. Alternatively, rather than being implemented as circuits, all or some of the components may be implemented in software and stored in the memory 612 of the application server 117, with the components controlling operation of application server 117 to implement the functions corresponding to the components when the components are executed by a processor e.g., processor 602. In some such embodiments, the assembly of components 800 is included in the memory 612 as part of assembly of software components 622. In still other embodiments, various components in assembly of components 800 are implemented as a combination of hardware and software, e.g., with another circuit external to the processor providing input to the processor which then under software control operates to perform a portion of a component's function.

When implemented in software the components include code, which when executed by a processor, e.g., processor 602, configure the processor to implement the function corresponding to the component. In embodiments where the assembly of components 800 is stored in the memory 612, the memory 612 is a computer program product comprising a computer readable medium comprising code, e.g., individual code for each component, for causing at least one computer, e.g., processor 602, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the application server 117 or elements therein such as the processor 602, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a component 802 configured to receive WAN messages, e.g., LoRaWAN messages, a component 804 configured to recover a set of data (e.g., LPN, timetag, entry/exit ID) corresponding to a detected vehicle entry or exit at a parking garage or parking lot, e.g. from a receive WAN message, a component 806 configured to store the recovered set of data corresponding to the detected vehicle entry or exit, a component configured to recover a low resolution image portion, e.g., fragment, of an image or a license plate, a component 810 configured to generate a low resolution image of a license plate from a set of low resolution image portions, e.g. fragments, e.g., different portions having been received in different WAN messages, and a component 812 configured to store the generated low resolution image of the license plate, e.g. in database along with a corresponding received set of metadata (LPN, timetag, entry/exit ID info).

Assembly of components 800 further includes a component 814 configured to generated and update a parking lot table based on received sets of data and generated low resolution images of license plates, a component 816 configure to determine current parking lot space availability, a component 818 configured to present a generated parking lot table to a user, a component 820 configured to send (e.g., via a cellular network) a request for a high resolution of license plate, a component 822 configured to receive a high resolution image of a license plate (e.g., communicated via a cellular path), a component 824 configured to store a received high resolution image of a license plate, a component 826 configured to determine billing for a vehicles usage of the parking lot or parking garage, e.g., based on received time tag information for a detected vehicle entry and detected vehicle exit for a vehicle, and a component 828 configured to command an edge compute platform to delete stored parking information corresponding to a vehicle in response to confirmation of payment.

Numbered List of Exemplary Method Embodiments

Method Embodiment 1 A method for tracking use of a parking facility, the method comprising: capturing (310), at an entrance or exit of a parking facility, a first image including a license plate portion which includes a license plate number, said first image being at a first resolution; extracting (312) the license plate number from the first image; and communicating (322) to an application server (117), via a wide area wireless communications network, the license plate number and a time stamp.

Method Embodiment 2 The method of Method Embodiment 1, further comprising: generating said time stamp (308) while a vehicle with a first license plate having said first license plate number is present at said entrance or exit.

Method Embodiment 3 The method of Method Embodiment 2, further comprising: cropping (324) the first image to generate a cropped image of a first license plate region of interest, said cropped image of the first license plate region of interest being at said first resolution; and storing (326) the cropped image of the first license plate region of interest.

Method Embodiment 4 The method of Method Embodiment 3, further comprising: generating (340) a first low resolution license plate region of interest image from the cropped image of the first license plate region of interest, said first low resolution license plate region of interest image having a second resolution which is lower than said first resolution.

Method Embodiment 5 The method of Method Embodiment 4, wherein said first resolution is an image resolution of at least 1920×1080 pixels.

Method Embodiment 6 The method of Method Embodiment 5, wherein said second resolution is a 720×486 pixel resolution or lower.

Method Embodiment 7 The method of Method Embodiment 4, wherein generating (340) the first low resolution license plate region of interest image includes: performing a down sampling operation on said cropped image of a first license plate region of interest.

Method Embodiment 8 The method of Method Embodiment 7, wherein generating (340) the first low resolution license plate region of interest image further includes: performing a color to monochrome image conversion operation.

Method Embodiment 9 The method of Method Embodiment 8, wherein generating (340) the first low resolution license plate region of interest image further includes: performing an erosion operation.

Method Embodiment 10 The method of Method Embodiment 4, further comprising: fragmenting (350) the first low resolution license plate region of interest image into image fragments.

Method Embodiment 11 The method of Method Embodiment 10, further comprising: detecting (352) an available transmission opportunity; and transmitting (356) one or more fragments over the wireless wide are network for delivery to the application server.

Method Embodiment 12 The method of Method Embodiment 11, wherein said one or more fragments are transmitted as image blobs (where blob stands for Binary Large Object and refers to a group of connected pixels in a binary image).

Method Embodiment 13 The method of Method Embodiment 11, further comprising: determining (358) that there is at least one more fragment of the first low resolution license plate region of interest to transmit; and transmitting (356) the additional fragment over the wireless wide area network for delivery to the application server.

Method Embodiment 14 The method of Method Embodiment 11, further comprising: receiving (360) a request (e.g., from the application server) for a high definition (HD) version of a stored license plate image portion; and transmitting (362), via a cellular network, the requested HD version of the stored license plate image portion.

Method Embodiment 15 The method of Method Embodiment 14, wherein the requested HD version of a stored license plate image portion requests a HD version of the first low resolution license plate region of interest; and wherein the wide area wireless communications network over which the first low resolution license plate region of interest image was transmitted supports a lower data rate than said cellular network.

Numbered List of Exemplary System Embodiments

System Embodiment 1 A system ((customer premises system102) or (customer premises system 102 in combination with application server 117)) for tracking use of a parking facility (101), the system comprising: a camera (one of 166, 168, 176, 178, 186, 188, 196, 198) for capturing (310), at an entrance or exit of a parking facility, a first image including a license plate portion which includes a license plate number, said first image being at a first resolution; and an edge compute platform (103) coupled to said camera, said edge compute platform including a first processor (124) configured to control the edge compute platform to: extract (312) the license plate number from the first image; and communicate (322) to an application server (117), via a wide area wireless communications network (including wide area network (110) wireless transmitter (116) of the edge compute platform (103)), the license plate number and a time stamp.

System Embodiment 2 The system of System Embodiment 1, wherein said first processor (124) is further configured to control the edge compute platform to:
generate said time stamp (308) while a vehicle with a first license plate having said first license plate number is present at said entrance or exit.

System Embodiment 3 The system of System Embodiment 2, wherein said first processor (124) is further configured to control the edge compute platform to: crop (324) the first image to generate a cropped image of a first license plate region of interest, said cropped image of the first license plate region of interest being at said first resolution; and store (326) (e.g., in memory (146) or storage device (147)) the cropped image of the first license plate region of interest.

System Embodiment 4 The system of System Embodiment 3, wherein said first processor (124) is further configured to control the edge compute platform to: generate (340) a first low resolution license plate region of interest image from the cropped image of the first license plate region of interest, said first low resolution license plate region of interest image having a second resolution which is lower than said first resolution.

System Embodiment 5 The system of System Embodiment 4, wherein said first resolution is an image resolution of at least 1920×1080 pixels.

System Embodiment 6 The system of System Embodiment 5, wherein said second resolution is a 720×486 pixel resolution or lower.

System Embodiment 7 The system of System Embodiment 4, wherein said first processor (124) is further configured to control the edge compute platform to: perform a down sampling operation on said cropped image of a first license plate region of interest, as part of being configured to generate (340) the first low resolution license plate region of interest image.

System Embodiment 8 The system of System Embodiment 7, wherein said first processor (124) is configured to control the edge compute platform to perform a color to monochrome image conversion operation, as part of being configured to generate (340) the first low resolution license plate region of interest image.

System Embodiment 9 The system of System Embodiment 8, said first processor (124) is configured to control the edge compute platform to: perform an erosion operation, as part of being configured to generate (340) the first low resolution license plate region of interest image.

System Embodiment 10 The system of System Embodiment 4, wherein said first processor (124) is further configured to control the edge compute platform to: fragment (350) the first low resolution license plate region of interest image into image fragments.

System Embodiment 11 The system of System Embodiment 10, wherein said first processor (124) is further configured to control the edge compute platform to: detect (352) an available transmission opportunity; and transmit (356) (via a wide area network interface's (110) wireless transmitter (116)) one or more fragments over the wireless wide area network for delivery to the application server (117).

System Embodiment 12 The system of System Embodiment 11, wherein said one or more fragments are transmitted as image blobs (where blob stands for Binary Large Object and refers to a group of connected pixels in a binary image).

System Embodiment 13 The system of System Embodiment 11, wherein said first processor (124) is further configured to control the edge compute platform to: determine (358) that there is at least one more fragment of the first low resolution license plate region of interest to transmit; and transmit (356) (via the wide area network interface's wireless transmitter (116)) the additional fragment over the wireless wide area network for delivery to the application server (117).

System Embodiment 14 The system of System Embodiment 11, wherein said first processor (124) is further configured to control the edge compute platform to: receive (360) (via a receiver of a cellular interface) a request (e.g., from the application server) for a high definition (HD) version of a stored license plate image portion; and transmit (362) (via a transmitter (120) of its cellular interface (112)), via a cellular network, the requested HD version of the stored license plate image portion.

System Embodiment 15 The system of System Embodiment 14, wherein the requested HD version of a stored license plate image portion requests a HD version of the first low resolution license plate region of interest; and wherein the wide area wireless communications network over which the first low resolution license plate region of interest image was transmitted supports a lower data rate than said cellular network.

System Embodiment 16 The system of System Embodiment 15, further comprising: said application server (117), said application server (117) including: a second processor (602), and wherein said second processor (602) is configured to: generate parking records (e.g., each parking record corresponding to a detected vehicle entry or exit and including a plate number, a time tag and a low resolution image of the license plate portion of a captured image (e.g., constructed by the application server from a set of received image fragments) from information received from the edge compute node via the wide area wireless network; and process multiple records corresponding to the same license plate number to determine a time that a vehicle remained in the parking area (e.g., for billing purposes).

System Embodiment 17 The system of System Embodiment 16, wherein said second processor (602) is further configured to: operate the application server (117) to send a message to the edge compute platform (103) commanding the edge compute platform to delete stored images corresponding to a vehicle plate number in response to confirmation that billing has been paid for the parking time corresponding to the stored images.

Numbered List of Exemplary Non-Transitory Computer Readable Medium Embodiments

Non-transitory computer readable medium Embodiment 1 A non-transitory computer readable medium (146) including computer executable instructions which when executed by a processor (124) of an edge compute platform (103) of a customer premises system (102) cause the customer premises system (102) to perform the steps of: capturing (310), at an entrance or exit of a parking facility, a first image including a license plate portion which includes a license plate number, said first image being at a first resolution; extracting (312) the license plate number from the first image; and communicating (322) to an application server (117), via a wide area wireless communications network, the license plate number and a time stamp.

Non-transitory computer readable medium Embodiment 2 A non-transitory computer readable medium (612) including computer executable instructions which when executed by a processor (602) of an application server (117) cause the application server (117) to perform the steps of: generating parking records (e.g., each parking record corresponding to a detected vehicle entry or exit and including a plate number, a time tag and a low resolution image of the license plate portion of a captured image (e.g., constructed by the application server from a set of received image fragments) from information received from the edge compute node via the wide area wireless network; and processing multiple records corresponding to the same license plate number to determine a time that a vehicle remained in the parking area (e.g., for billing purposes).

In various embodiments the processor 124 in the compute platform 103 controls the compute platform 103 and/or the camera and entrance/exit control system 105 to implement one, more or all of the steps of one or more of the methods described herein. This can include controlling the processor 124 in the compute platform to perform the step or steps or controlling another component, e.g., an accelerator or graphics processing unit 142 of the compute platform 103 to perform a step or steps while another element of the compute platform performs another one of the steps. For example, time stamp generation may be performed by the processor of the compute platform or by the processor of a camera 176 or 196 or another sensor used as one of the license plate image capture devices. Similarly image processing operations such as cropping, downsampling, conversion from color to monochrome, optical character recognition to determine a license plate number, downsampling, etc. may be, and sometimes is, performed by the processor 124 or an accelerator or co-processor (e.g., GPU) 142.

In some embodiments, the processor or processors, e.g., CPUs, of one or more devices, are configured to control the devices, e.g. devices in which they are located and/or coupled to, to perform the steps of the methods described as being performed. The configuration of the processor may be achieved by using one or more components, e.g., software components, to control processor configuration and/or by including hardware in the processor, e.g., hardware components, to perform the recited steps and/or control processor configuration. The components in devices may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node or device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as an optical line terminal or optical modem. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method for tracking use of a parking facility, the method comprising:
   generating a first low resolution license plate region of interest image from a cropped image of a first license plate region of interest having a first resolution, said first low resolution license plate region of interest image having a second resolution which is lower than said first resolution;
   fragmenting the first low resolution license plate region of interest image into image fragments to generate a set of image fragments representing the first low resolution license plate region of interest;
   detecting available wireless transmission opportunities; and
   transmitting image fragments wirelessly to an application server using different wireless transmission opportunities to transmit different image fragments.

2. The method of claim 1, further comprising:
   cropping a first image to generate the cropped image of the first license plate region of interest.

3. The method of claim 2, further comprising:
   storing the cropped image of the first license plate region of interest.

4. The method of claim 2, further comprising:
   storing the cropped image of the first license plate region of interest; and
   providing the stored cropped image of the first license plate region in response to a request.

5. The method of claim 3, wherein generating the first low resolution license plate region of interest image includes:
   performing a down sampling operation on said cropped image of the first license plate region of interest.

6. The method of claim 5, wherein generating the first low resolution license plate region of interest image further includes:
   performing a color to monochrome image conversion operation.

7. The method of claim 6, wherein generating the first low resolution license plate region of interest image further includes:
   performing an erosion operation.

8. The method of claim 4, further comprising:
   determining that there is at least one more fragment of the first low resolution license plate region of interest to transmit.

9. The method of claim 8, further comprising:
   transmitting an additional fragment over a wireless wide area network for delivery to the application server.

10. The method of claim 9, further comprising:
receiving a request for a high definition (HD) version of a stored license plate image portion.

11. The method of claim 9, further comprising:
transmitting, via a cellular network, the requested HD version of the stored license plate image portion.

12. The method of claim 11,
wherein the requested HD version of a stored license plate image portion requests a HD version of the first low resolution license plate region of interest; and
wherein the wide area wireless communications network over which the first low resolution license plate region of interest image was transmitted supports a lower data rate than said cellular network.

13. A system for tracking use of a parking facility, the system comprising:
a camera for capturing a first image including a license plate portion which includes a license plate number, said first image being at a first resolution; and
an edge compute platform coupled to said camera, said edge compute platform including a first processor configured to control the edge compute platform to:
generate a first low resolution license plate region of interest image from a cropped image of a first license plate region of interest having a first resolution, said first low resolution license plate region of interest image having a second resolution which is lower than said first resolution;
fragment the first low resolution license plate region of interest image into image fragments to generate a set of image fragments representing the first low resolution license plate region of interest;
detect available wireless transmission opportunities; and
transmit image fragments wirelessly to an application server using different wireless transmission opportunities to transmit different image fragments.

14. The system of claim 13, wherein said first processor is further configured to control the edge compute platform to:
crop the first image to generate the cropped image of the first license plate region of interest.

15. The system of claim 14, wherein said first processor is further configured to control the edge compute platform to:
store the cropped image of the first license plate region of interest.

16. The system of claim 14, wherein said first processor is further configured to control the edge compute platform to:
store the cropped image of the first license plate region of interest; and
provide the stored cropped image of the first license plate region in response to a request.

17. The system of claim 15, wherein said first processor is further configured to control the edge compute platform to:
perform a down sampling operation on said cropped image of the first license plate region of interest, as part of being configured to generate the first low resolution license plate region of interest image.

18. The system of claim 15, wherein said first processor is further configured to control the edge compute platform to:
fragment the first low resolution license plate region of interest image into image fragments.

19. The system of claim 18, wherein said first processor is further configured to control the edge compute platform to:
receive a request for a high definition (HD) version of a stored license plate image portion; and
transmit, via a cellular network, the requested HD version of the stored license plate image portion.

20. A non-transitory computer readable medium including computer executable instructions which when executed by a processor of an edge compute platform of a customer premises system cause the customer premises system to perform the steps of:
generating a first low resolution license plate region of interest image from a cropped image of a first license plate region of interest having a first resolution, said first low resolution license plate region of interest image having a second resolution which is lower than said first resolution;
fragmenting the first low resolution license plate region of interest image into image fragments to generate a set of image fragments representing the first low resolution license plate region of interest;
detecting available wireless transmission opportunities; and
transmitting image fragments wirelessly to an application server using different wireless transmission opportunities to transmit different image fragments.

* * * * *